(12) United States Patent
Chan et al.

(10) Patent No.: US 8,230,106 B2
(45) Date of Patent: Jul. 24, 2012

(54) METHODS AND APPARATUS FOR IMPROVED TRANSMISSION CONTROL PROTOCOL TRANSMISSION OVER A WIRELESS CHANNEL EXHIBITING RATE AND DELAY VARIATIONS

(75) Inventors: Mun-Choon Chan, Edison, NJ (US); Ramachandran Ramjee, Edison, NJ (US)

(73) Assignee: Alcatel Lucent, Paris (FR)

( * ) Notice: Subject to any disclaimer, the term of this patent is extended or adjusted under 35 U.S.C. 154(b) by 2284 days.

(21) Appl. No.: 10/403,551

(22) Filed: Mar. 31, 2003

(65) Prior Publication Data

US 2004/0215753 A1   Oct. 28, 2004

(51) Int. Cl.
*G06F 15/16* (2006.01)
(52) U.S. Cl. ......... 709/235; 370/394; 370/412; 370/429
(58) Field of Classification Search .................. 709/235; 370/394, 412, 429
See application file for complete search history.

(56) References Cited

U.S. PATENT DOCUMENTS

| 6,038,216 | A * | 3/2000 | Packer ........................... 370/231 |
| 6,215,769 | B1 * | 4/2001 | Ghani et al. .................. 370/230 |
| 6,252,851 | B1 * | 6/2001 | Siu et al. ....................... 370/236 |
| 6,904,286 | B1 * | 6/2005 | Dantu ........................ 455/452.2 |
| 7,047,312 | B1 * | 5/2006 | Aweya et al. ................. 709/235 |
| 2002/0176443 | A1 * | 11/2002 | Wei et al. ..................... 370/468 |

* cited by examiner

*Primary Examiner* — Thu Nguyen
*Assistant Examiner* — Thomas Dailey
(74) *Attorney, Agent, or Firm* — The Law Offices of Peter H. Priest

(57) ABSTRACT

Techniques and systems for managing transmissions from a TCP source by regulating the flow of acknowledgement signals to the TCP source are described. An acknowledgement signal regulator monitors a data queue used to buffer data packets received from the TCP source and an acknowledgement signal queue used to store acknowledgement signals to be transmitted to the TCP source. An acknowledgement signal release manager determines the available space in the data queue and the expected number of data packets arriving at the data queue, and manages the release of acknowledgement signals from the acknowledgement signal queue to the TCP source so as to prevent an undesired overflow of the data queue resulting from the arrival of an excessive number of data packets from the TCP source.

20 Claims, 14 Drawing Sheets

METHODS AND APPARATUS FOR IMPROVED TRANSMISSION CONTROL PROTOCOL TRANSMISSION OVER A WIRELESS CHANNEL EXHIBITING RATE AND DELAY VARIATIONS

FIELD OF THE INVENTION

The present invention relates generally to improved systems and techniques for wireless data transmission. More particularly, the invention relates to advantageous techniques for reducing congestion losses for transmissions over a wireless transmission control protocol channel by controlling the flow of data from a transmission control protocol data source in order to prevent buffer overflow and congestion losses.

BACKGROUND OF THE INVENTION

The use of wide area wireless network connections for data transfer between users and particularly for connection to the Internet is increasing and can be expected to continue to increase, due to the great flexibility provided to users by such access. One particularly important and widely implemented standard for wide area wireless network connections is 3G1X, offering speeds up to 144 kbps. Data only enhancements to this standard have been codified in the 3G1X-EVDO standard, which offers speeds of up to 2 Mbps. In order to achieve continued growth and acceptance, networks constructed according to these standards, and wireless networks using technology developed in the future, must offer good performance for transmission control protocol (TCP) transmission of data, which is a very widely used standard for packet switched transmission of data and is the standard predominantly used for transmission of data over the Internet. In order to satisfy users, communication must occur over a transmission channel at a rate approximating the stated rate for the transmission channel, with a high degree of accuracy. In order to achieve this goal, special attention must be paid to overcoming the special problems attendant upon wireless transmission of data.

Wireless connections are much more subject to losses than are wired connections. Losses require retransmission with an accompanying delay in transmission, and are therefore interpreted as congestion by TCP devices. The sensing of congestion leads to suppression of transmission by data sources, decreasing net throughput of data. In order to mitigate the effects of losses, 3G wireless systems often implement extensive local retransmission mechanisms. For example, the physical layer of a 3G wireless link has a forward error correction (FEC) mechanism and a link layer retransmission protocol. These mechanisms insure packet loss probability of less than one percent on the wireless link, thereby mitigating the adverse impact of loss on TCP throughput. However, while these mechanisms mitigate losses, they also increase delay variability.

In addition, in order to increase throughput, intelligent channel state based scheduling techniques are also widely employed. These techniques take the quality of the wireless channel experienced by a user into account when determining whether to transmit to the user. For example, a user experiencing a better channel quality may be given priority. Typically, algorithms are used to help increase throughput while avoiding data starvation for users experiencing a lower channel quality. The use of such scheduling techniques increases overall throughput, but also increases rate variability.

The impact of losses on TCP throughput have thus been significantly reduced by local link layer mechanisms and higher raw throughput achieved by channel state based scheduling mechanisms, but these improvements have come at the cost of increased delay and rate variability. TCP data transmission is asynchronous, with a data source transmitting a packet of data upon receipt of an acknowledgement signal, or ACK, at the data source. The ACK indicates that the data recipient has received a data packet and that the recipient is ready for the next packet. The data recipient stores data packets in a buffer until ready to process them. However, if too many data packets arrive at a data recipient at one time, the buffer overflows and data is lost, requiring retransmission. The varying delay values and transmission rates exhibited by wireless channels tend to cause unevenly timed flows of data, with unevenly timed flows of ACKs being transmitted to the data source. Rate and delay variability tend to cause ACKs to arrive at the data source in bursts. The arrival of ACKs in bursts is commonly referred to as ACK compression. ACK compression results in data compression, that is, the transmission of data in bursts by the TCP source. Such bursts of data transmissions can overload the data buffers at any of the intermediate routers. Most frequently, if overloading at a data buffer occurs at an intermediate router, the router affected is the bottleneck router. Overloading of a data buffer causes detection of a data loss by the data recipients, requests for retransmission, and congestion.

There exists, therefore, a need for managing the flow of ACKs from data recipients to a data source that will reduce or eliminate ACK compression and in turn prevent excessive bursts of data from the data source, in order to reduce or eliminate data loss and throughput degradation resulting from buffer overflow and data loss caused by the arrival of excessive numbers of data packets and the buffer.

SUMMARY OF THE INVENTION

A data transmission system according to an aspect of the present invention includes a plurality of mobile devices, with one or more base stations serving mobile devices through radio transmission of data to the mobile devices. A base station is suitably controlled by a radio network controller, which receives TCP transmissions from a TCP source and translates the TCP data to radio transmissions for relaying to the mobile devices. In order to prevent the transmission of ACKs in excessive bursts, the radio network controller implements an ACK regulator. The ACK regulator manages the flow of ACKs to insure that the TCP source operates in congestion avoidance mode and that no more than a single packet loss is experienced. The ACK regulator maintains a data queue for data received from the TCP source, and an ACK queue for storage of ACKs to be transmitted to the TCP source. Upon dequeueing of a data packet or enqueueing of an ACK, the ACK regulator examines the data queue and the ACK queue, and also estimates the number of data packets in transit to the radio network controller. The ACK regulator computes a value for a space availability variable indicating the available space in the data queue. The ACK regulator then computes a value for ACK release variable, comprising the sum of the number of data packets in the data queue and the estimated number of data packets in transit. The ACK regulator operates in a conservative mode or a nonconservative mode, based on an estimated size of a congestion window of the TCP source. If the ACK regulator is operating in the conservative mode, it increases the value of the ACK release variable by 1. The reason for the increase in the value of the ACK release variable is to reserve extra space within the data queue so as to insure that no data loss will occur when operation in conservative mode is occurring, even if the TCP window size at the TCP source increases. Once the ACK release variable has been computed, the ACK regulator updates the space availability variable by subtracting the value of the ACK release variable from the space availability variable. The ACK regulator then directs the transmission of the number of ACKs indicated by the value of the updated space availability variable, up to the total number of ACKs in the ACK queue.

A more complete understanding of the present invention, as well as further features and advantages of the invention, will be apparent from the following Detailed Description and the accompanying drawings.

DETAILED DESCRIPTION

The present invention will be described more fully hereinafter with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Figure 1:
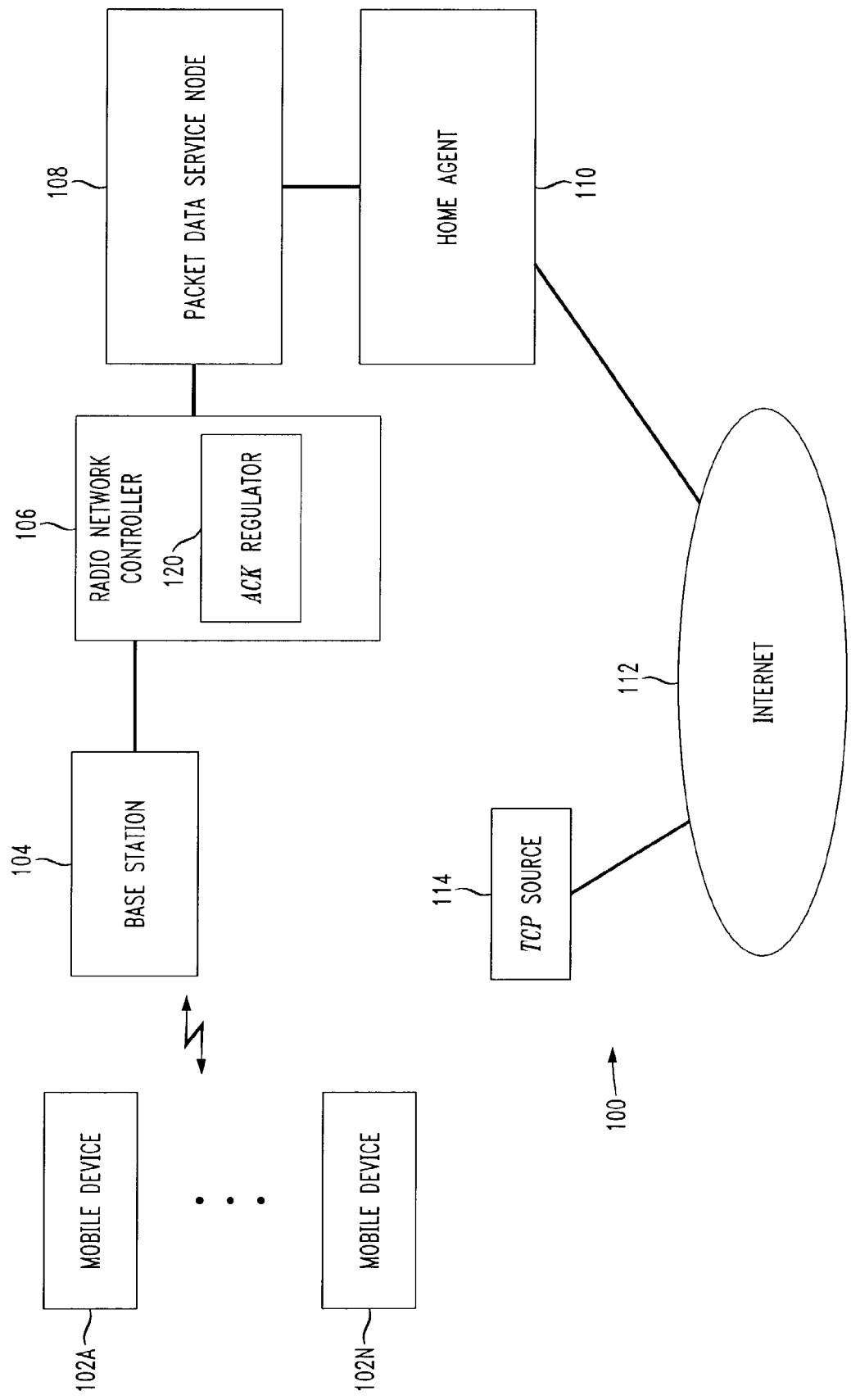
FIG. 1 illustrates a wireless communication system according to an aspect of the present invention.

FIG. 1 illustrates a TCP system 100 advantageously employing the teachings of the present invention. The system 100 includes a plurality of mobile devices 102A . . . 102N, served by a base station 104. The base station 104 is in turn served by a radio network controller (RNC) 106, that performs CDMA specific functions such as soft handoff, encryption, power control and other functions necessary to insure proper data transmission by the base station 104. The RNC also performs link layer retransmission using radio link protocol (RLP).

The RNC is connected to a packet data service node (PDSN) 108 using a generic routing encapsulation (GRE) tunnel. A GRE tunnel is a form of internet protocol in internet protocol (IP in IP) tunnel. The PDSN 108 terminates point to point protocol (PPP) with the mobile device. If mobile IP service is enabled, the PDSN 108 also acts as a foreign agent and connects to a home agent 110, which in turn may connect to the Internet 112. The tunneling between the various nodes allows for these nodes to be connected directly through IP/asynchronous transfer mode (IP/ATM) networks.

For simplicity, the system 100 is illustrated here as including one base station 104 and one RNC 106. It will be recognized however, that a system may suitably include a number of base stations, with one RNC supporting a number of base stations. A system may also include a number of RNCs, with one PDSN supporting a plurality of RNCs, and may scale up to include a plurality of PSDNs, with each PSDN supporting a plurality of RNCs.

The RNC 106 receives a PPP/IP packet from the PDSN 108 through the GRE tunnel. The RNC 106 fragments this packet into a number of radio frames and then performs transmission and local retransmission of these radio frames. The base station 104 receives the radio frames from the RNC 106 and then schedules the transmission of the radio frames on the wireless link using a scheduling algorithm that takes the state of the wireless channel into consideration. One of the mobile devices 102A . . . 102N receives the radio frames. If the mobile device discovers loss of radio frames, it requests local retransmission using the RLP protocol. In order to implement RLP, the RNC 106 keeps a per user queue of radio frames. The RNC 106 can typically scale up to tens of base stations and thousands of active users.

TCP packets are relayed to the RNC 106 by the PSDN 108, which serves as a conduit for transferring information, including TCP packets, between the Internet and the RNC 106. TCP packets relayed to the RNC 106 by the PSDN 108 are in turn relayed to the correct ones of the mobile devices 102A . . . 102N, depending on address information included in the TCP packets. TCP packets originate in a plurality of TCP sources, each of which may suitably be a device connected to the Internet 112 and communicating with other devices and systems, such as the network 100, through the exchange of TCP packets. An exemplary TCP source 114 is illustrated here.

TCP packets are received from the Internet 112 by the PSDN 108 and routed to the mobile device 102 by the RNC 106, which performs appropriate processing on the TCP data in order to transmit it over a wireless link to the mobile device 102. Upon receiving a TCP packet, the mobile device 102 sends an ACK to the RNC 106, which manages the transmission of ACKs to the PSDN 108. Each ACK is relayed by the PSDN 108 through the Internet 112 and to the TCP source, that is, the device originating the TCP packet whose proper receipt is indicated by the ACK. Upon receiving a data packet, the RNC 106 transfers an ACK to the PSDN 108, from which the ACK is transferred to the TCP source, effectively requesting a new data packet. The TCP source sends a TCP packet upon receiving the ACK. The RNC 106 implements various scheduling techniques in order to insure a smooth flow of data to the mobile devices 102A . . . 102N, and these scheduling techniques lead to rate and delay variability in transmission. If not addressed, this rate and delay variability would result in ACK compression, resulting in turn in data compression in data transmissions from the PSDN 108. An excessive number of packets arriving at the RNC 106 at one time would result in buffer overflows, unless sufficient buffer capacity was available to accommodate the largest burst of packets that could be anticipated.

However, an excessive buffer size for the RNC 106 is undesirable. An RNC such as the RNC 106 may serve thousands of users, with the RNC 106 receiving a flow of TCP packets for each user. The RNC 106 would require a very large buffer size in order to be able to accommodate bursts of data for all of the TCP flows that it must accommodate. In addition, excessive buffering results in an excessive round trip time for a data packet. The round trip time of a packet is the time elapsed from the time a packet is sent until the time an acknowledgement is received. Detection of a lost packet, and the retransmission of the packet, is often accomplished through a timeout, or waiting until a specified time has elapsed and retransmitting the packet if an ACK is not received by that time. A large buffer size calls for an increase in the specified time that must be allowed until a timeout is declared. This longer timeout time is required because a packet must be given time to wait in the buffer until other packets preceding it in the buffer are delivered, so that it too can be delivered and acknowledged. An excessive timeout time slows throughput.

In addition, an excessive timeout time causes a reduction in the round trip time sampling rate, resulting in an increased likelihood of spurious timeouts. Moreover, an excessive timeout time increases the likelihood that data in the queue will become obsolescent, for example if the user aborts the transmission. In such cases, the obsolete data will still need to be drained from the queue, with the bandwidth devoted to this obsolete data being wasted.

In order to overcome these difficulties, the system 100 includes an ACK regulator 120, preferably implemented as a function of the RNC 106. The ACK regulator 120 controls the flow of ACKs to the PDSN 108, in order to manage the flow of TCP data to the RNC 106. The ACK regulator 120 controls the flow of ACKs back to the PDSN 108. The flow of ACKs is controlled so that the RNC 106 does not experience any buffer overflow loss unless the congestion window at the TCP source reaches a predetermined threshold. Even if the threshold is reached, the ACK regulator 120 allows only a single buffer overflow loss. The ACK regulator 120 helps to insure that the TCP source operates in the congestion avoidance phase. The operation of the TCP source and the various effects of rate and delay variation are described in greater detail below, but a general discussion of the operation of the TCP source and the effects of rate and delay variation in the absence of the ACK regulator 120 will be conducive to understanding the philosophy behind the design of the ACK regulator 120.

The ACK regulator 120 helps to insure that the TCP source operates in the congestion avoidance phase of TCP transmission. In the absence of the ACK regulator 120, the TCP source operates in the congestion avoidance phase in an ideal environment. Such an environment is one wherein transmissions exhibit a constant round trip time and a constant service rate, where loss is suffered only through buffer overflow and where only single packet losses are experienced. The performance of a TCP source in such an environment is graphically illustrated in FIG. 2.

Figure 2:
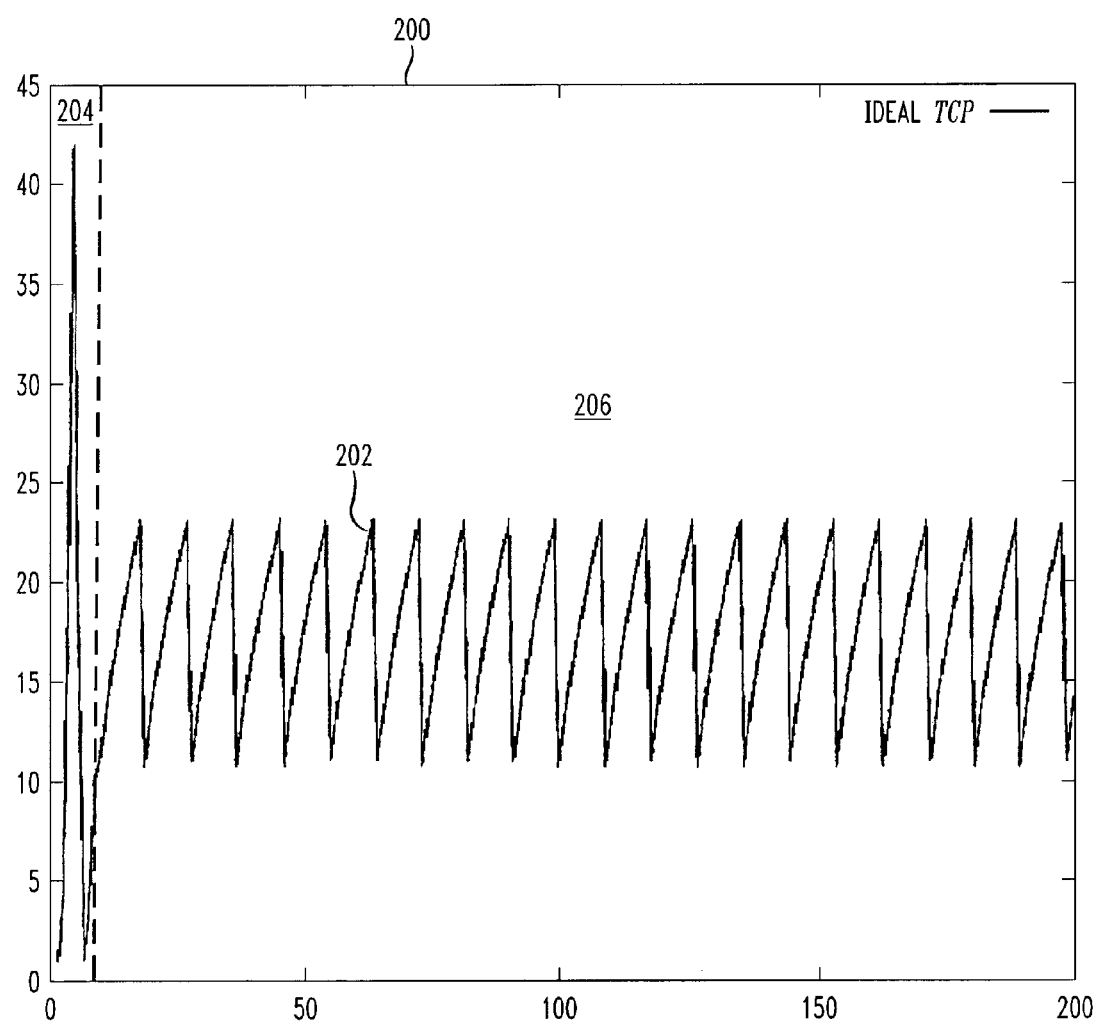
FIG. 2 illustrates a graph of congestion window performance over time in an environment providing constant rate and delay.

Graph 200 of FIG. 2 shows a curve 202 plotting congestion window size, measured in number of packets, over time for a long lived TCP connection. The curve 202 exhibits an initial phase, commonly called the slow start phase 204, in which the TCP source begins to examine the connection for available bandwidth. After the slow start phase 204, the TCP source goes to congestion avoidance phase 206, in which the congestion window increases in size at a steady rate until the congestion window size is equal to the buffer size available at the packet destination. At this point, a packet loss occurs. The congestion window then drops to a predetermined level and begins rising again, until another packet loss occurs. The congestion window size then falls off again and begins rising, and so on. The curve 202 has a sawtooth shape during the congestion avoidance phase.

Figure 3:
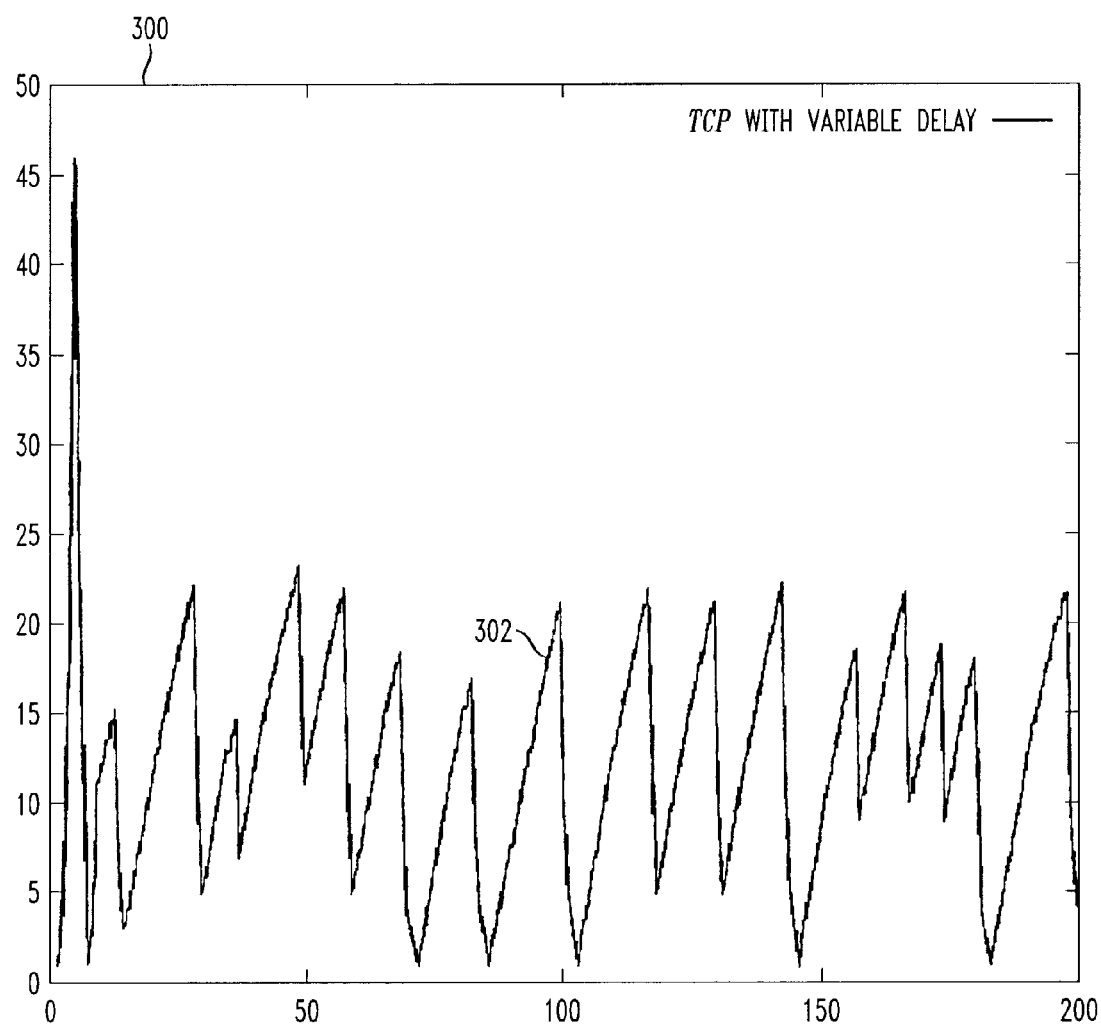
FIG. 3 illustrates a graph of congestion window performance over time in an environment providing variable rate and delay.

The above described scenario holds in cases of constant rate and delay, but breaks down when the rate and delay presented by the transmission channel vary. FIG. 3 illustrates a graph 300, showing a curve 302, plotting congestion window size against time. The curve 302 is highly irregular when there is a substantial variation in the link delay, because the delay variation results in ACK compression, that is, the sending of ACKs in closely spaced bursts. The ACK compression causes transmission bursts at the TCP source, resulting in multiple packet losses.

Variations in rate and delay result in a number of deviations from ideal behavior for the TCP congestion window. Firstly, in the constant rate and delay environment, a loss due to a buffer overflow is always a loss of a single packet. However, variable rate and delay introduce possibilities for multiple packet losses due to ACK compression. The presence of double and multiple packet losses present significant problems and have a significant effect on throughput. Use of the ACK regulator 120 helps to insure that the TCP source operates in the congestion avoidance phase even in the presence of varying rate and delay, and that double and multiple packet losses occur rarely if at all.

Figure 4:
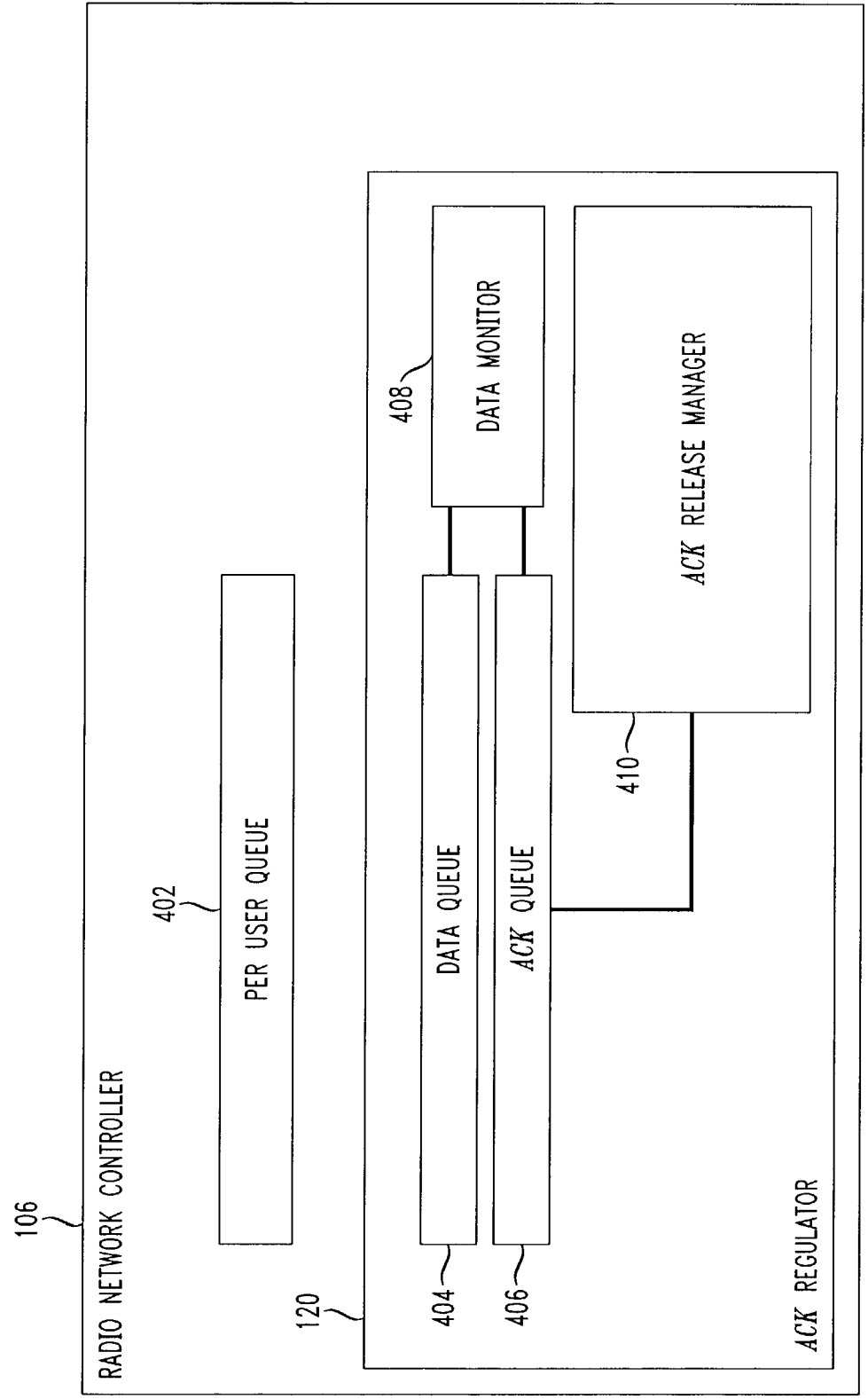
FIG. 4 illustrates a radio network controller including an ACK regulator according to an aspect of the present invention.

FIG. 4 illustrates the RNC 106 in additional detail, showing details of one implementation of the ACK regulator 120. The RNC 106 maintains a per user queue as part of its normal operation. Because the RNC 106 is shown here for simplicity as serving only one base station 104, the RNC 106 includes a single user queue 402. The ACK regulator 120 controls the flow of ACKs from the RNC 106 to the TCP source in order to insure that the amount of data queued for transmission in the RNC 106 is not so great as to cause a buffer overflow. To this end, the ACK regulator 120 maintains a data queue for each TCP stream. In the present exemplary embodiment, the RNC 106 serves only one base station 104, so the ACK regulator 120 maintains only a single data queue 404. It will be recognized, however, that the ACK regulator 120 may suitably maintain a large number of data queues, one for each base station served by the RNC 106.

The ACK regulator 120 also maintains an ACK queue 406, in order to hold ACKs and release them for transmission to the TCP source only when the ACK regulator 120 determines that another packet can be accommodated. The ACK regulator 120 maintains a data monitor 408, in order to monitor the packets and free space present in the data queue 404 and the number of ACKs in the ACK queue 406. The ACK regulator 120 further includes an ACK release manager 410, which receives information about the number of queued packets and ACKs in the data queue 404 and the ACK queue 406, respectively, and determines when to release ACKs, based on the number of queued data items and the amount of available space in the data queue 404.

The ACK regulator 120 operates in at least two modes, a conservative mode and a nonconservative mode, depending on conditions sensed by the ACK release manager 410. In the conservative mode, the ACK release manager 410 sends an ACK for transmission to the TCP source only when the data queue 404 has buffer space for at least two data packets. With the TCP source operating in the congestion avoidance phase, no buffer overflow loss occurs as long as the ACK regulator 120 operates in conservative mode. The reason for this is that during the congestion avoidance phase, the TCP source increases its window size by at most one packet upon reception of an ACK. Thus, upon receipt of an ACK, the TCP source sends either one packet, with no window increase, or two packets, in which case the window size increases. If the data queue 404 has space available for at least two packets at the time an ACK is sent, no packet loss can occur.

In the nonconservative mode, ACK release manager 410 releases an ACK provided that space is available in the data queue for at least one data packet. In this mode of operation, a buffer overflow loss will occur if the TCP source increases the window size. Two packets will be sent with space for only one.

The ACK regulator 120 operates every time an ACK arrives in the ACK queue 406 or a data packet is sent from the data queue 404. Either of these events raises the possibility that an ACK should be sent to the TCP source. Arrival of an ACK presents the need to send an ACK, while sending of a data packet increases the buffer space available and therefore gives rise to the possibility of sending an ACK.

When the data monitor 408 detects the arrival of an ACK or the sending of a data packet, it invokes the ACK release manager 410 and sends to the ACK release manager 410 an indication of the available space in the data queue 404 and the number of ACKs present in the ACK queue 406. The ACK release manager 410 then examines the space available in the data queue 404, and computes a value for a buffer availability (BufferAvail) variable indicating the number of available spaces in the data queue 204.

The ACK release manager then computes value for an acknowledgement signal release count (ACKreleasecount) variable, which is the sum of the number of ACKs that have been sent to the TCP source and the number of data packets estimated to be in transit to the RNC 106. The variable ACKreleasecount indicates the number of packets that can be expected to arrive at the data queue 404, because it indicates the number of packets already inbound, together with an indication of the number of ACKs that have been transmitted. These transmitted ACKs can be expected to cause packets to arrive at the data queue 404.

If the ACK regulator 120 is operating in conservative mode, the ACK release manager 410 increases the value of the variable ACKreleasecount by one, to take into account the fact that operation in conservative mode requires the data queue 404 to be able to accommodate at least two packets. After making any needed adjustments in the value of the variable ACKreleasecount, the ACK release manager 410 reduces the value of the BufferAvail variable by the value of the variable ACKreleasecount.

The ACK release manager 410 then compares the number of ACKs present in the ACK queue 406 with the value of the BufferAvail variable. If the number of ACKs is less than or equal to the value of the BufferAvail variable, the ACK release manager 410 releases all the ACKs. If the number of ACKs is greater than the value of the BufferAvail variable, the ACK release manager 410 releases a number of packets corresponding to the value of the BufferAvail variable.

Transmission of ACKs can be accomplished using any of a number of techniques commonly known in the art. For example, ACKs may be transmitted one at a time or alternatively only the most recent ACK may be transmitted due to the cumulative nature of TCP ACKs. Whatever transmission method is used, however, must be adapted to make sure that duplicate ACKs are preserved, as the TCP source relies on the number of duplicate ACKs to adjust its congestion window. Also, whenever three or more duplicate ACKs are transmitted, the RNC 106 suitably provides an indication of this fact to the ACK release manager 410, which then reserves one additional space in the data queue 404, in order to allow for fast retransmission. In addition, whenever the RNC 106 performs a limited transmit, it may suitably indicate this to the ACK release manager 410, in order to allow the ACK release manager 410 to reserve space in the data queue 404 for two additional packets.

The ACK release manager 410 determines whether the RNC 120 should operate in conservative or nonconservative mode based on the TCP window size of the TCP source. If the TCP window size is sufficiently large, an increase in the window size can occur while resulting in no more than a single packet loss.

When first invoked, the ACK regulator 120 initially operates in conservative mode. Whenever a predetermined TCP window size is reached, the operating mode is changed to nonconservative mode. The TCP window size is preferably approximated by taking the difference between the largest sequence number in the data queue and the smallest sequence number in the ACK queue. This approximation is a reasonable one to make, because any bottleneck is probably due to the wireless link represented by the RNC 106, and most or all queueing of data is performed by the RNC 106.

Suitably, the operating mode changes from conservative to nonconservative mode when the TCP window size is equal to the product of the size of the data queue 404 and a predetermined multiplier $\alpha$. A larger value for $\alpha$ delays loss until the window size is relatively large, thereby increasing bandwidth. However, a larger value for a increases the round trip time for data packets, because it increases the number of packets in the data queue 404. This increase in round trip time does not reduce throughput significantly unless the TCP source is window limited. Thus, a larger value for $\alpha$ typically increases roundtrip time and bandwidth, while a smaller value for $\alpha$ reduces roundtrip time and bandwidth.

When $\alpha \geq 4$, throughput decreases for larger buffer sizes, that is, where the data queue is larger than 15 packets. This decrease in throughput is caused by the accumulation of a sufficiently large number of duplicate ACKs that are sent to the TCP source. In fast recovery mode, the usable congestion window experienced by the TCP source is the sum of the congestion window size in packets and the number of duplicate ACKs. Because the ACK regulator 120 simply transmits ACKs, normal or duplicate, without reserving additional buffer space for duplicate ACKs, if the number of duplicate ACKs received by the source exceeds the window size of the source, the source sends a new packet for each additional duplicate ACK received. These new packets are dropped at the RNC 106, causing multiple packet losses. As a result, if no mechanism is added to the ACK regulator 120 to recognize and manage duplicate ACKs, the value of $\alpha$ should be relatively small, for example less than 3, to avoid accumulating too many duplicate ACKs.

Experiments and simulations have shown that as $\alpha$ increases from 1 to 3, the TCP flow is able to achieve its maximum throughput at a smaller buffer size. However, as α increases, the round trip time also increases. For larger buffer sizes, increasing α does not increase throughput, because the TCP transmission rate is already at its maximum. However, increasing α does increase the roundtrip time, without providing any advantage in throughput.

One way to avoid trading off between round trip time and bandwidth is to design the ACK release manager 410 to set α to a higher value when the buffer is small, resulting in higher throughput, and a lower value when the buffer is large, resulting in the same throughput but a shorter round trip time.

When operating in the nonconservative mode, the ACK release manager 410 does not reserve additional space in the data queue 404. Therefore, the next increase in the size of the TCP window will result in a single packet loss. At the detection of this packet loss, suitably accomplished by the RNC 106 which provides an indication of the loss to the ACK release manager 410, the ACK release manager 410 changes its mode of operation to conservative mode. This procedure insures that losses will be of the single loss variety so long as the estimate of the expected number of arriving data packets is conservative. In addition, whenever the length of the data queue 404 goes to zero or the TCP window size is halved, the ACK release manager 410 changes its operation to conservative mode, to account for recognition of losses elsewhere in the network. Alternatively, if the TCP source is ECN capable, the ACK release manager 410 does not need to switch to nonconservative mode. Instead, it can mark the ECN bit to signal to the TCP source to reduce its congestion window, so that no packet loss will occur.

In order to compute a correct value for ACKreleasecount, the ACK release manager 410 must estimate the expected number of data packets. An overestimate would result in unnecessary reservation of packet space, and an underestimate would result in buffer overflow losses because more data packets would arrive than could be accommodated in the space that had been reserved.

Given knowledge of the TCP source used and the round trip time from the RNC 106 to the source, an exact estimate of the expected number of packets can be computed. However, it is desirable to be able to compute an estimate without needing to know details of the TCP source, and it is also desirable for the estimate to be robust against varying round trip times that may occur in a wired network. Therefore, the estimate is computed conservatively. Whenever the ACK release manager 410 releases ACKs to the TCP source, it updates the estimated number of incoming data packets by that many ACKs. For example, if the initial estimate is two, and five ACKs are released, the new estimate is seven. Similarly, whenever a data packet arrives in the data queue 404, the estimate is decremented, but is not allowed to fall below zero.

The above procedure avoids underestimation of the incoming data packets, but corrections and adjustments may need to be made in order to avoid overestimating as a result of accumulated errors. For example, the estimate is increased whenever ACKs are sent to the TCP source, but if the source is reducing its window size due to packet loss, data packets will not be received in response to the ACKs. If no adjustments are made to correct for this occurrence, the estimate will increase whenever such an error occurs. Therefore, the estimate is reset to zero whenever the data queue 404 is empty. Performing such an operation synchronizes the estimated number of expected packets with the actual number whenever a data loss occurs. The operation is not a conservative mechanism in general, because when the estimate is zero, no space in the data queue 404 is reserved for any incoming data packets that are unaccounted for. However, if the resetting operation is performed only when the data queue 404 is empty, the chance that the unaccounted for data packets will cause a buffer overflow loss is relatively small. The reason for this is that the estimate is reset to zero only when the data queue 404 is empty, that is, only when the entire space in the data queue 404 is available.

Figure 5:
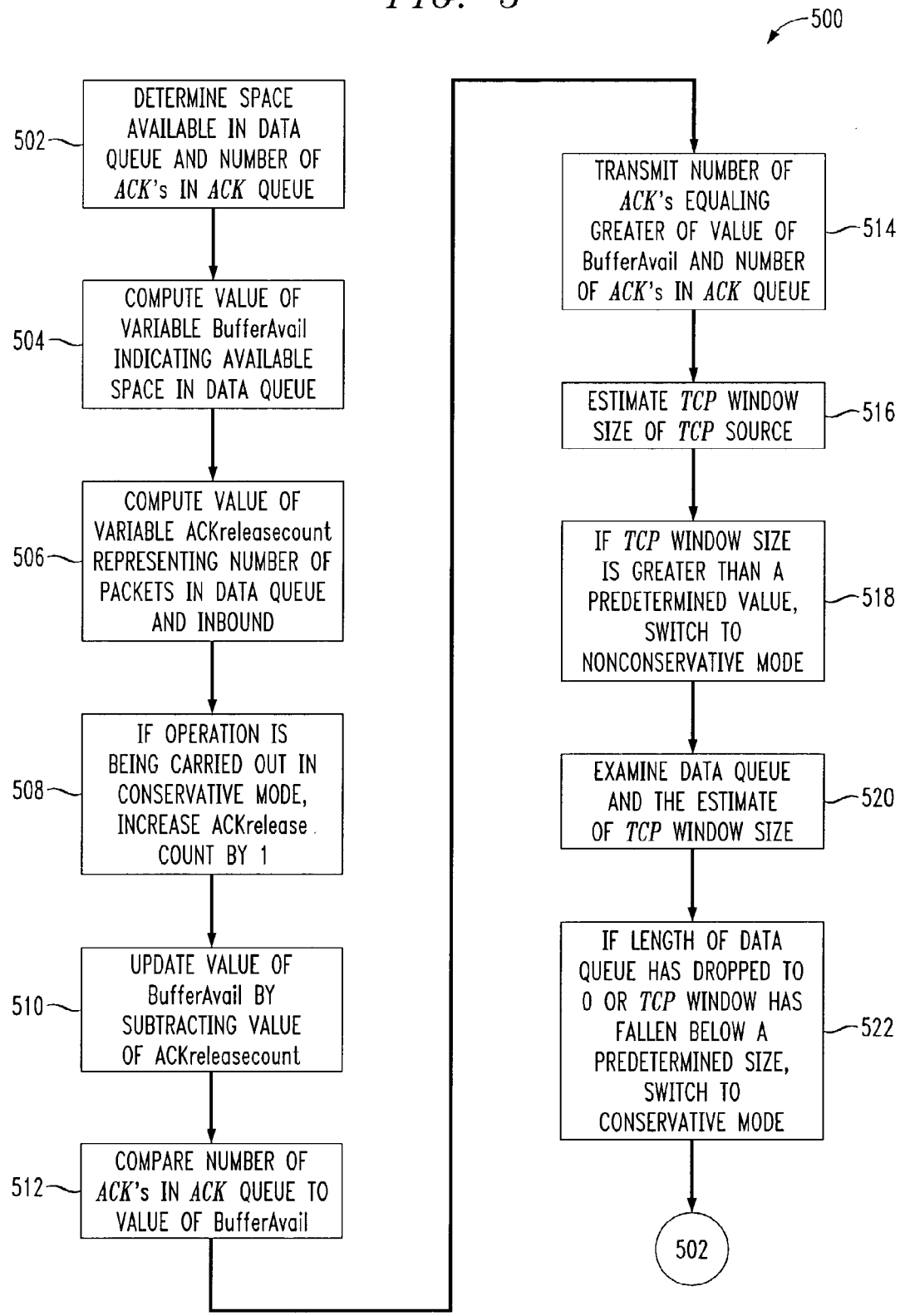
FIG. 5 illustrates a method of data communication according to an aspect of the present invention.

FIG. 5 illustrates the steps of a process 500 of TCP data transmission management according to an aspect of the present invention. The process 500 may suitably be performed using an ACK regulator such as the ACK regulator 120 of FIGS. 1 and 2, and may be implemented in a radio network controller such as the radio network controller 106 of FIGS. 1 and 2, and may suitably be used to manage communications carried out over a communication system such as the system 100 of FIG. 1. At step 502, upon dequeueing of a data packet from a data queue storing data packets received from a TCP source, or the arrival of an ACK in an ACK queue storing ACKs to be transmitted to the TCP source, a determination is made of the available space in the data queue and the number of ACKs in the ACK queue. At step 504, a value is computed for a variable BufferAvail, representing the available space in the data queue. The available space in the data queue is the total number of data packets that can be accommodated in the data queue minus the number of data packets in the data queue. At step 506, a value is computed for a variable ACKreleasecount, representing the sum of the number of ACKs that have been transmitted and an estimate of the packets in transit from the TCP source. At step 508, if the mode of operation is the conservative mode, the value of ACKreleasecount is increased by 1, if the mode of operation is the nonconservative mode, the value of ACKreleasecount is not decreased. At step 510, the value of the variable BufferAvail is reduced by the value of the variable ACKreleasecount. At step 512, the number of ACKs in the ACK queue is compared to the value of the variable BufferAvail. At step 514, the number of ACKs equaling the value of the variable BufferAvail is transmitted to the TCP source, up to the total number of ACKs present in the ACK queue. At step 516, an estimate is made of the TCP congestion window size for the TCP source. At step 518, if the window size is greater than a predetermined value, suitably a predetermined multiple of the size of the data queue, the mode of operation is switched to nonconservative mode. At step 520, an examination is made of the data queue and of the estimate of the TCP window size. At step 522, if the length of the data queue has dropped to zero or if the size of the TCP window has been reduced below a predetermined size, operation is switched to conservative mode. The process then returns to step 502.

Some observations providing insight into the motivation of the development and design of an ACK regulator such as the 120 are presented below, followed by presentation of performance statistics relating to the use of an ACK regulator. The difficulties overcome through the use of an ACK regulator, and the undesirable occurrences that the ACK regulator is designed to prevent, can be understood by modeling the performance of a system such as the system 100 in the presence of rate and delay variation. Such a system may be understood by considering a single long lived TCP flow over a network with a single bottleneck server, exhibiting rate variation based on a specified general distribution, with a single wireless link attached to the bottleneck server. The wireless link exhibits delay variation based on another specified distribution. The single bottleneck server models the performance of the PDSN 108 of FIG. 1 and the wireless link models the performance of the RNC 106 of FIG. 1.

A convenient first step in the development of a model is to create a model of the behavior of the congestion window of a TCP source in the ideal environment. As noted above, the ideal environment is characterized by a constant round trip time and service rate, where loss is suffered only through buffer overflow. This transmission technique can be modeled as follows. Let $\mu$ be the constant service rate, $\tau$ the constant propagation delay, T the minimum round trip time, also expressed as ($\tau+1/\mu$), and B the buffer size. The curve follows a regular sawtooth pattern, going from $W_0$ to $W_{max}$, where $W_0=W_{max}/2$ and $W_{max}=\mu\tau+B+1$, and then falling back to $W_0$ once a packet loss occurs. The rise from $W_0$ to $W_{max}$ can be considered as occurring over two time periods, or epochs. In the first epoch, which may suitably be called epoch A, the congestion window increases from $W_0$ to $\mu T$ in time $t_A$ with the number of packets sent being $n_A$. In the second epoch, which can be referred to as epoch B, the congestion window increases from $\mu T$ to $W_{max}$, in time $t_B$ with the number of packets sent being $n_B$. TCP throughput, ignoring the slow start phase, is given by $(n_A+n_B)/(t_A+t_B)$, where $$t_A = T(\mu T - W_0) \tag{1}$$

$$n_A = (W_0 t_A + t^2_A/(2T))/T \tag{2}$$

$$t_B = (W^2_{max} + (\mu T)^2)/2\mu \tag{3}$$

$$n_B = \mu t_B \tag{4}$$

The above described model is very accurate provided that the values of $\mu$ and T remain constant, but it breaks down when the constant service rate and propagation assumptions are not true. Variable rate and delay result in a number of deviations from ideal behavior for the TCP congestion window. Firstly, the ideal model described above always experiences a loss of a single packet due to a buffer overflow, but variable rate and delay introduces possibilities for multiple packet losses due to ACK compression. Therefore, a model that accurately reflects conditions resulting from rate and delay variations must account for these possibilities. The model described above can be extended to account for the possibilities of multiple packet losses by introducing additional parameters reflecting the probabilities of these packet losses. Suitable parameters used for this purpose are p1, p2 and p3. These parameters represent, respectively, the conditional probability of a single packet loss, a double packet loss and three or more packet losses. Under this definition, the total sum of these probabilities is 1, that is, p1+p2+p3=1.

Secondly, the loss in the ideal model always occurs when the window size reaches $W_{max}$, but in a model that takes variable rate and delay into account, losses can occur at different window sizes because the values of $\mu$ and $\tau$ are variable instead of constant. This characteristic of operation is modeled by a parameter $$W_f = \sqrt{\sum_{i=1}^{N} W^2_{max_i} / N},$$

that is, the square root of the second moment of the $W_{max}$ values of each cycle. This parameter is used instead of obtaining a simple mean of $W_{max}$ values because throughput is related to $W_f$ quadratically, since it is the area under the curve in the congestion window graph.

Thirdly, a model contemplating multiple packet losses needs to consider timeouts and slow starts, as well as simple congestion avoidance. Loss of a single packet is followed by congestion avoidance, but multiple packet losses may result in a timeout, a request of retransmission, and a renewed slow start as a search is made for available bandwidth. The timeout duration may suitably be represented by a parameter $T_0$.

The congestion window behavior of a TCP source experiencing rate and delay variation is highly variable, and representing such behavior requires several modifications to the model for a TCP source experiencing a constant rate and delay. The propagation delay may be approximated by $\hat{\tau}$, which is the average propagation delay in the presence of delay variability. The service rate is represented by $\hat{\mu}$. Thus, the round trip time $\hat{T}=(\hat{\tau}+1/\hat{\mu})$. The model may suitably take into account three different congestion window patterns. The first, occurring with probability p1, is a single loss followed by congestion avoidance. The second, occurring with probability p2, is a double loss followed by congestion avoidance. The third, occurring with probability p3, is a triple loss and timeout followed by a slow start and congestion avoidance. The assumption is made that three or more packet losses result in a timeout.

The first event to be contemplated is the single loss event in the congestion avoidance phase. This scenario follows the same pattern discussed above, for constant rate and delay. Such a scenario may be thought of as taking place in two time periods, or epochs, which may suitably be referred to as the A1 and B1 epochs. In the A1 epoch, the window size grows from $W_{01}$ to $\hat{\mu}\hat{T}$ in time $t_{A1}$, with the number of packets transmitted being $n_{A1}$. In the B1 epoch, the window size grows from $\hat{\mu}\hat{T}$ to $W_f$ in time $t_{B1}$, with the number of packets transmitted being $n_{B1}$. Thus, with probability p1, $n_{A1}+n_{B1}$ packets are transmitted in time $t_{A1}+t_{B1}$, where $$W_{01} = \text{int}(W_f/2) \tag{5}$$

$$t_{A1} = \hat{T}(\hat{\mu}\hat{T} - W01) \tag{6}$$

$$n_{A1} = (W_{01} t_{A1} + t^2_{A1}/(2\hat{T}))/\hat{T} \tag{7}$$

$$t_{B1} = (W_f^2 + (\hat{\mu}\hat{T})^2)(2\hat{\mu}) \tag{8}$$

$$n_{B1} = \hat{\mu} t_{B1} \tag{9}$$

Figure 6:
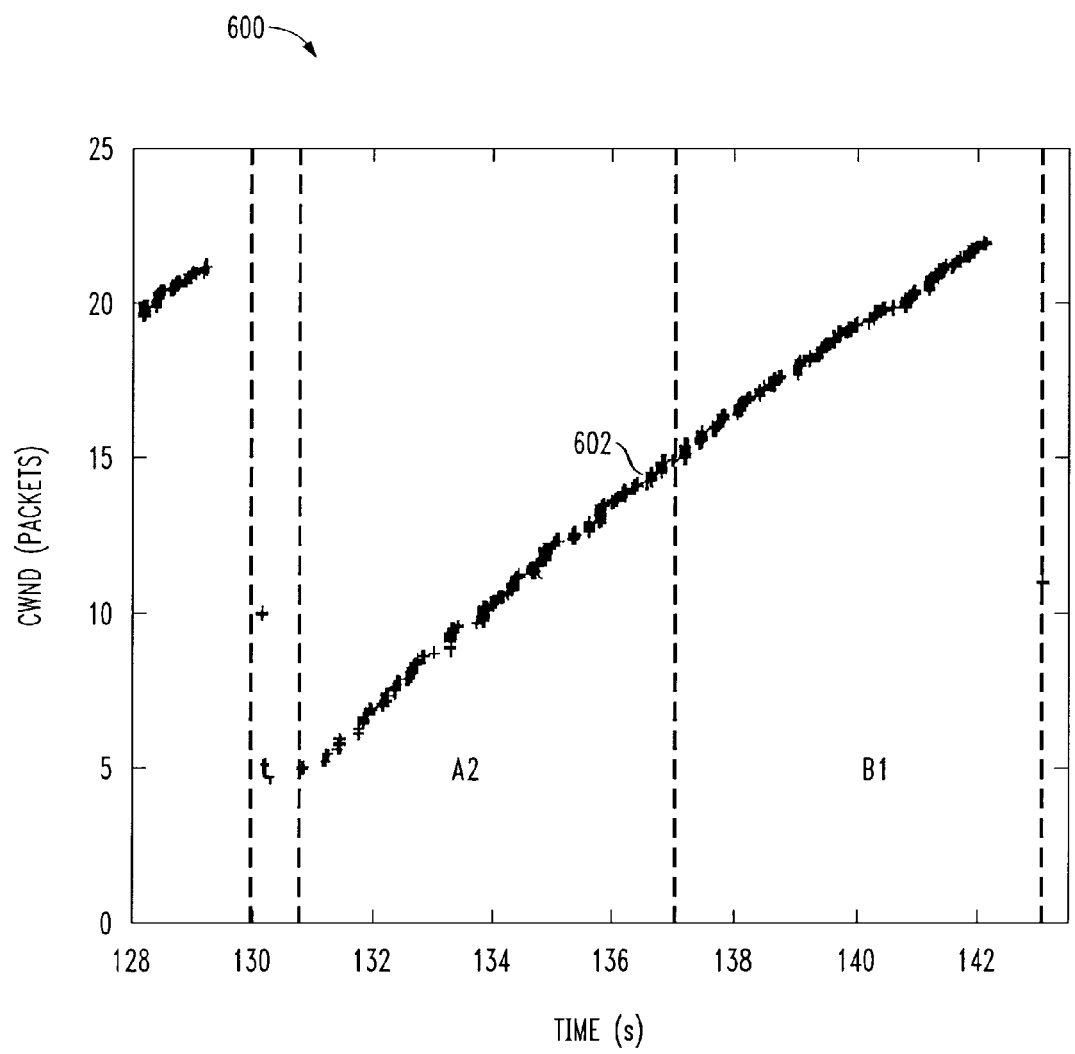
FIG. 6 illustrates a graph of throughput over time during the occurrence of a two packet loss event.

The next event to be considered is the two loss event. An example of this event is illustrated in FIG. 6, which illustrates a graph 600 showing a curve 602 plotting the congestion window behavior over time. In this exemplary case, after the first fast retransmission, which occurs at approximately 130 seconds, the source receives another set of duplicate ACKs to trigger a second fast retransmit, occurring at approximately 131 seconds. This occurrence establishes the two losses, and the congestion window begins growing from $W_{02}$. The second retransmit is triggered by the new set of duplicate ACKs in response to the first retransmission. Thus, the duration between the first and second fast retransmit is the time required for the first retransmission to reach the receiver with a full buffer, plus the time for the duplicate ACK to return to the sender. In other words, this duration can be approximated by the average propagation delay with a full buffer, $\hat{T}+B/\hat{\mu}=t_R$. This scenario can be considered as occurring over three time periods, or epochs. The first is epoch $t_R$, with one retransmission and zero new packet. This epoch occurs at about 130-131 seconds in the example illustrated by the graph 600 of FIG. 6.

The second is epoch A2, with the window size growing from $W_{02}$ to $\hat{\mu}\hat{T}$ in time $t_{A2}$, with the number of packets transmitted being $n_{A2}$. This epoch occurs at approximately 131-137 seconds in the illustrated example. The third epoch is the B1 epoch, the same as the B1 epoch discussed above, with the window size growing from $\hat{\mu}\hat{T}$ to $W_f$ in time $t_{B1}$ with the number of packets transmitted being $n_{B1}$. This epoch occurs at approximately 137-143 seconds in the illustrated example. Thus, with probability p2, $n_{A2}+n_{B2}$ packets are transmitted in time $t_{A2}+t_{B2}$, where $$W_{02}=\text{int}(W_{01}/2) \quad (10)$$

$$t_R=\hat{T}+B/\hat{\mu}= \quad (11)$$

$$t_{A2}=\hat{T}(\hat{\mu}\hat{T}-W_{02}) \quad (12)$$

$$n_{A2}=(W_{02}t_{A2}+t^2_{A2}/(2\hat{T}))/\hat{T} \quad (13)$$

Figure 7:
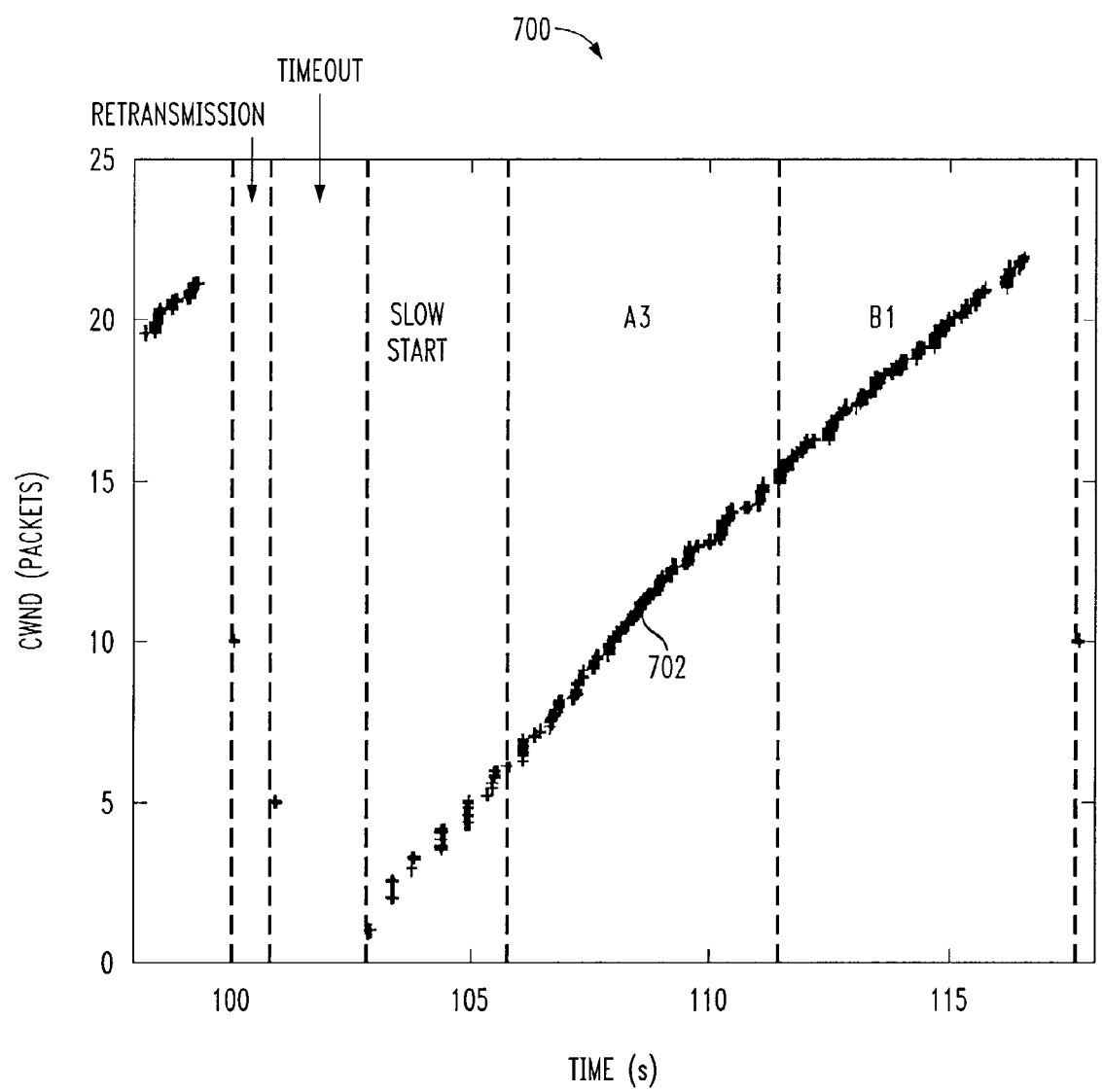
FIG. 7 illustrates a graph of throughput over time during the occurrence of a three packet loss event.

The last scenario to be considered is the three loss event. FIG. 7 illustrates a graph 700 showing a curve 702 plotting congestion window size in packets against time. In this case, after the first fast retransmit, the source receives another set of duplicate ACKs to trigger the second fast retransmit. This second fast retransmit does not repair the three losses and the TCP transmission times out. The scenario can be considered as occurring over five time periods, or epochs. The first is the retransmission epoch with time $t_R$ and 0 new packets, occurring at 100-101 seconds in the illustrated. The second is the timeout epoch, with time $t_R$ and 0 new packet, occurring at 101-103 seconds in the illustrated example. The third epoch is the slow start epoch, where the window grows exponentially up to the previous slow start threshold value of $W_{03}$ in time $t_{SS}$ with the number of packets transmitted being $n_{SS}$. This epoch occurs at 103-106 seconds in the illustrated example. The fourth epoch is the A3 epoch, where the window size grows from $W_{03}$ to $\hat{\mu}\hat{T}$ in time $t_{A3}$, with the number of packets transmitted being $n_{A3}$. This epoch occurs at 106-111 seconds in the illustrated example. The fifth epoch is the B1 epoch described above, occurring at 111-118 seconds in the illustrated example. Thus, with probability p3, $n_{SS}+n_{A3}+n_{B1}$ packets are transmitted in time $t_R+T_0+t_{SS}+t_{A2}+t_{B1}$, where $$W_{03}=\text{int}(W_{02}/2) \quad (14)$$

$$T_{SS}=\hat{T}\log_2(W_{03}) \quad (15)$$

$$n_{SS}=W_{03}/\hat{T} \quad (16)$$

$$t_{A3}=\hat{T}(\hat{\mu}\hat{T}-W_{03}) \quad (17)$$

$$n_{A3}=(W_{03}t_{A3}+t^2_{A3}/(2\hat{T}))/\hat{T} \quad (18)$$

Given that the different types of packet loss events are independent and using the assumption p1+p2+p3=1, the average TCP throughput can be approximated by a weighted combination of the three types of loss events:

$$\frac{(p3*(n_{SS}+n_{A3}))+(p2*n_{A2})+(p1*n_{A1})+n_{B1}}{(p3*(t_R+T_0+t_{SS}+t_{A3}))+(p2*(t_R+t_{A2}))+(p1*t_{A1})+t_{B1}} \quad (19)$$

The parameters for the model presented above, such as p1, p2, p3, $W_f$, $T_0$ and the like, can be inferred by examining graphical representations of actual data transmissions and deriving the appropriate parameters. Once parameters have been derived, the performance of the model can be evaluated.

Table 1 below lists various parameters used by the model for simulations exhibiting rate and delay variability. The simulation uses a packet size of 1000 bytes and a buffer of 10 packets, representing the product of the average bandwidth times average delay. The source is assumed not to be window limited. The simulation is conducted over 3600 seconds. Delay and rate variability are simulated with exponential and uniform distributions, respectively. Values in the form u(a,b) in the table represent uniform distribution with mean a and standard deviation b while e(a) represents an exponential distribution with mean a.

| Item | Rate (Kb/s) | Delay (ms) | pkts | $T_0$ | RTT | p1 | p2 | $W_f$ | $\hat{T}$ | $\hat{\mu}$ |
|---|---|---|---|---|---|---|---|---|---|---|
| 1 | 200 | 400 | 89713 | 1.76 | 616.2 | 0.998 | 0.000 | 22.00 | 440 | 25.0 |
| 2 | 200 | 380+e(20) | 83426 | 1.71 | 579.3 | 0.639 | 0.357 | 21.38 | 442 | 25.0 |
| 3 | 200 | 350+e(50) | 78827 | 1.79 | 595.8 | 0.599 | 0.367 | 21.24 | 461 | 25.0 |
| 4 | 200 | 300+e(100) | 58348 | 1.92 | 606.0 | 0.339 | 0.279 | 18.95 | 517 | 25.0 |
| 5 | u(200, 20) | 400 | 82180 | 1.75 | 578.1 | 0.535 | 0.460 | 21.61 | 400 | 24.74 |
| 6 | u(200, 50) | 400 | 74840 | 1.80 | 579.9 | 0.510 | 0.403 | 20.52 | 400 | 23.34 |
| 7 | u(200, 75) | 400 | 62674 | 1.86 | 585.9 | 0.398 | 0.348 | 19.05 | 400 | 20.93 |
| 8 | u(200, 50) | 350+e(50) | 70489 | 1.81 | 595.7 | 0.496 | 0.377 | 20.15 | 459 | 23.23 |
| 9 | u(200, 75) | 300+e(100) | 53357 | 2.03 | 635.7 | 0.404 | 0.298 | 17.78 | 511 | 20.93 |

Table 2 compares the throughput of simulation of different distributions for rate and delay variability at the server against the throughput predicted by the model presented above. The accuracy of the prediction, defined as one minus the ratio of the difference between the model and simulation throughput value, is listed in parentheses. It can be seen that the match between the simulation and the model is extremely accurate when the delay variation and rate variation are small, and is still well over 90% even when the variations are large.

| Item | Effective Simulator Throughput | Model Throughput (Accuracy) |
|---|---|---|
| 1 | 199.8 | 199.8(1.0) |
| 2 | 185.4 | 186.0(0.97) |
| 3 | 175.1 | 180.9(0.94) |
| 4 | 129.4 | 137.0(0.99) |
| 5 | 182.5 | 181.3(0.99) |
| 6 | 166.2 | 165.2(0.99) |
| 7 | 139.2 | 137.2(0.99) |
| 8 | 156.5 | 160.2(0.97) |
| 9 | 118.4 | 125.0(0.94) |

Examining Table 1 reveals the impact of delay and rate variability. As the variability increases, the probabilities of double loss, p2, and three or more losses, p3, begin to increase while the effective throughput of the TCP flow begins to decrease. For example, a comparison of case 1 to case 4 shows that p1 decreases from 0.998 to 0.339, while p3 increases.

Increases in p2 and p3 occur because when the product Tμ decreases, a channel that was previously accommodated a particular number of packets suddenly becomes smaller, causing additional packet losses. Given that $n_{A1}/t_{A1}$ is greater than $n_{A2}/(t_R+t_{A2})$, which is in turn greater than $(n_{SS}+n_{A3})/(t_r+T_0+t_{SS}+t_{A3})$, any solution that increases TCP performance must reduce the occurrences of multiple packet losses. For this reason, the ACK regulator 120 described above is designed to restrict any losses to a single packet loss.

The effects of employing an ACK regulator such as the ACK regulator described above can be seen in FIGS. 8-12, discussed below. FIGS. 8-12 illustrate various aspects of a simulation of a TCP Reno transmission with and without the use of an ACK regulator, and show the performance advantages provided by an ACK regulator.

Figure 8:
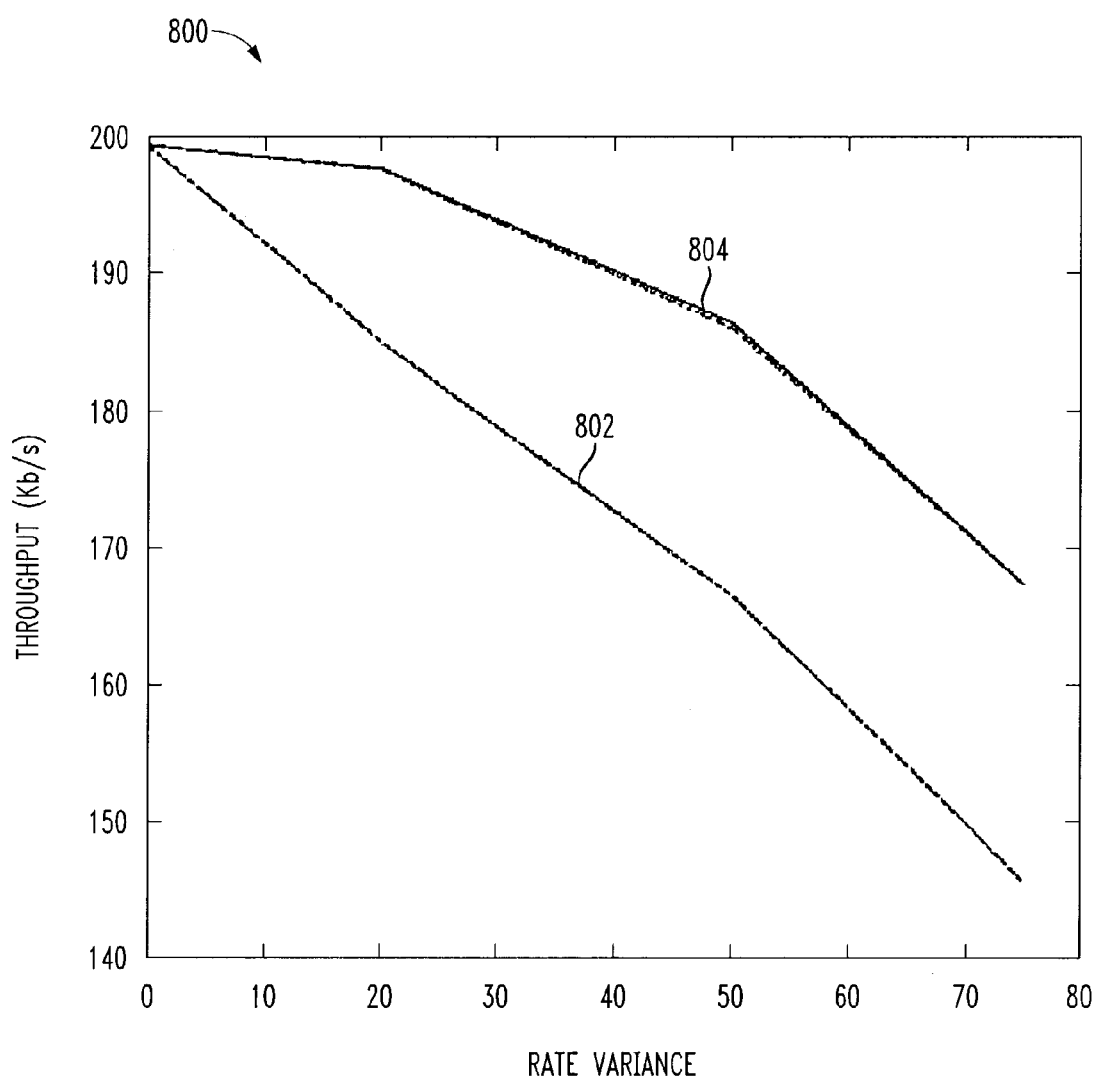
FIG. 8 illustrates a graph of throughput versus rate variance with and without the use of an ACK regulator according to an aspect of the present invention.

FIG. 8 illustrates a graph 800, showing throughput for a transmission using TCP Reno. Assumptions include the use of a single TCP flow, with the link bandwidth, FR, uniformly distributed with a mean of 200 kb/s. The variance ranges from 20 to 75. FD=200 ms, RR=64 kb/s and RD=200 ms. The buffer size on the bottleneck link is 10. The graph 800 shows the curve 802, plotting throughput against bandwidth variability in the absence of an ACK regulator, and the curve 804, plotting throughput against bandwidth variability in the presence of an ACK regulator in accordance with the present invention. The use of an ACK regulator provides significant advantages in throughput.

Figure 9:
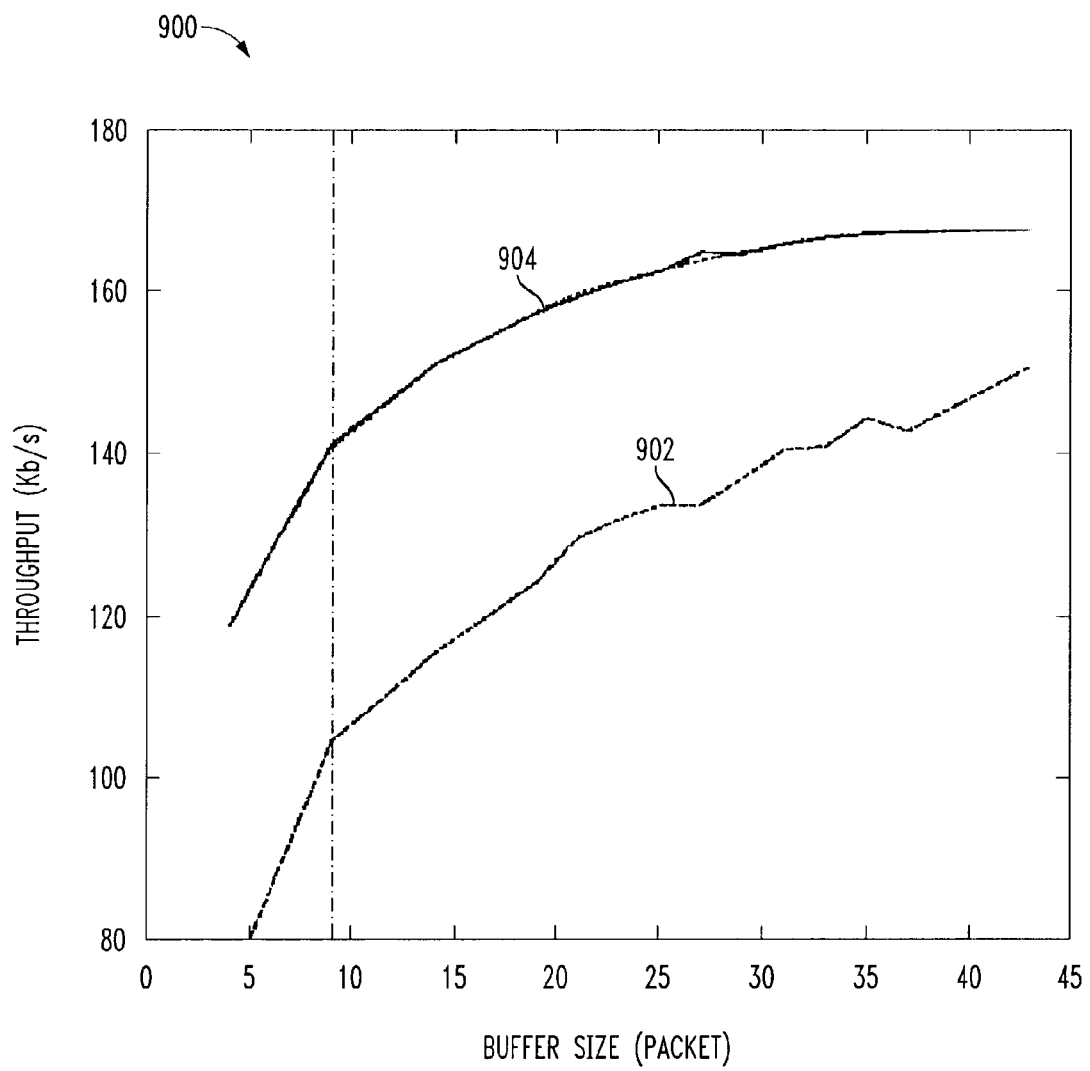
FIG. 9 illustrates a graph of throughput versus buffer size in a varying rate environment with and without the use of an ACK regulator according to an aspect of the present invention.

FIG. 9 illustrates a graph 900 showing curves 902 and 904, plotting throughput against buffer size without the use of an ACK regulator and with the use of an ACK regulator in the presence of an ACK regulator in accordance with the present invention, respectively. It can be seen that the use of an ACK regulator provides substantial advantages in throughput, especially for very small buffer sizes.

Figure 10:
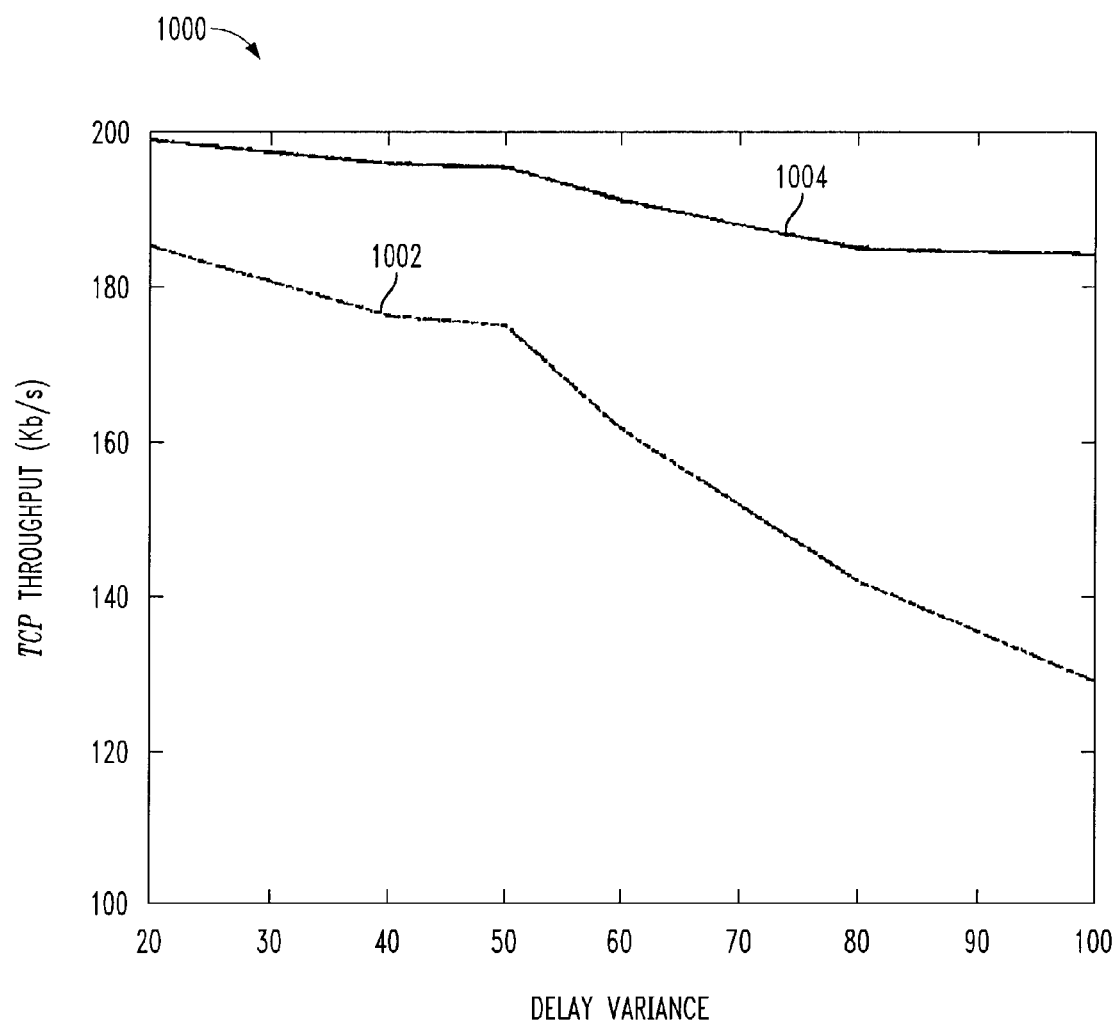
FIG. 10 illustrates a graph of throughput versus delay variance with and without the use of an ACK regulator according to an aspect of the present invention.

FIG. 10 illustrates a graph 1000 showing throughput for a single TCP flow with FR set to 200 kb/second and RR set to 64 kb per second. FD has an exponential distribution with a mean varying from 20 ms to 100 ms, and RD is set to 400 ms—mean(FD) so that the average of FD+RD is maintained at 400 ms. The size of the data queue for the bottleneck link is set to 10, which is the product of the mean throughput of 200 kb/s, that is, 25 packets per second, and the mean propagation delay of 0.4 second. The graph 1000 includes curves 1002 and 1004, showing throughput plotted against delay variation for transmissions without the use of an ACK regulator and with the use of an ACK regulator in the presence of an ACK regulator in accordance with the present invention, respectively. It can be seen that throughput is significantly higher in the presence of an ACK regulator, and decrease much more slowly with increasing delay variation when an ACK regulator is used.

Figure 11:
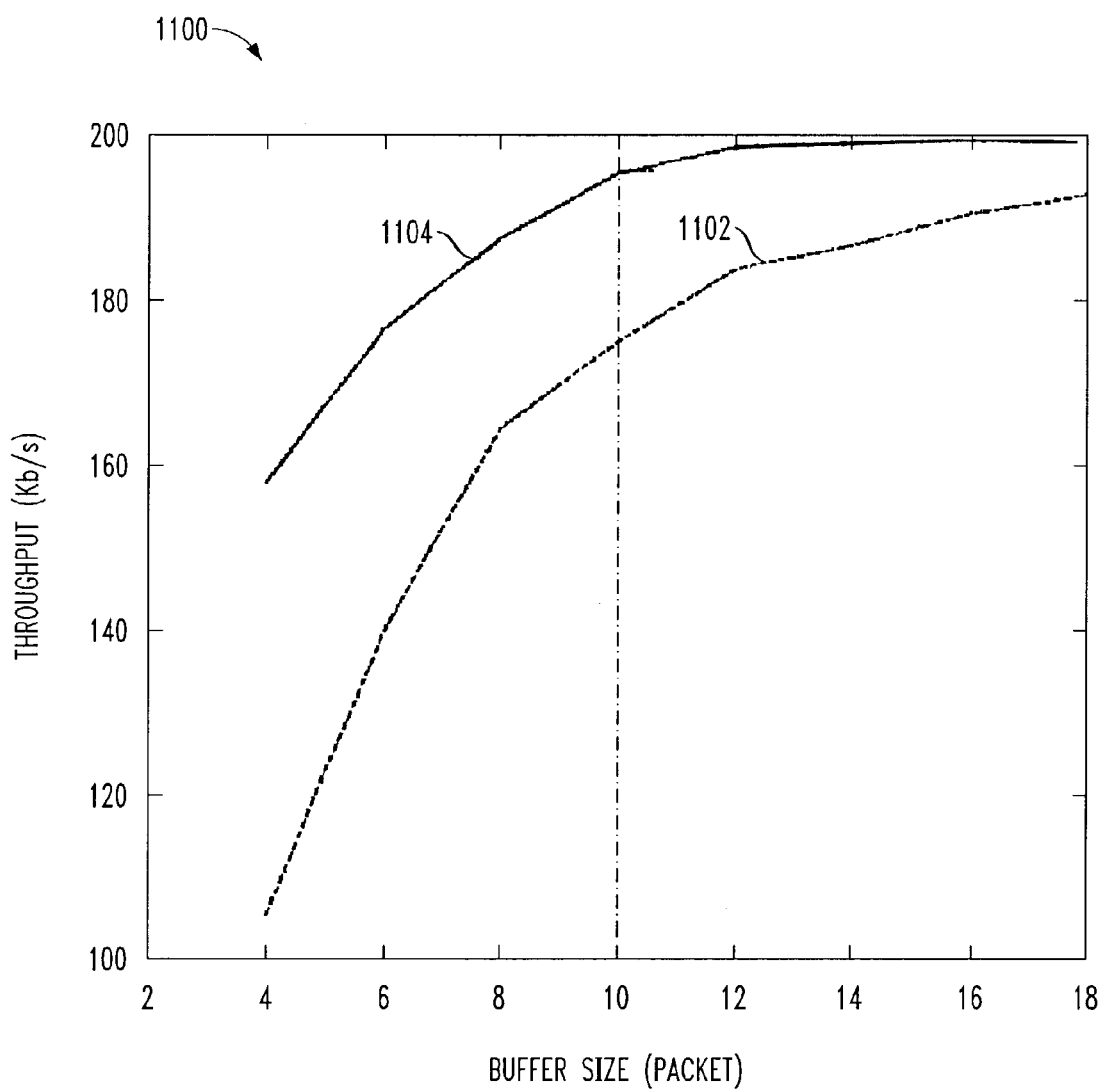
FIG. 11 illustrates a graph of throughput versus buffer size in a varying delay environment with and without the use of an ACK regulator according to an aspect of the present invention.

FIG. 11 illustrates a graph 1100, showing throughput variation plotted against buffer size. The curve 1102 shows the situation in the absence of an ACK regulator, and the curve 1104 shows the situation in the presence of an ACK regulator in the presence of an ACK regulator in accordance with the present invention. The same set of parameters is used as for the graph 1000 of FIG. 10, except that the value of FD is fixed, exponentially distributed about a mean of 50 ms. Examining the curve 1104 shows that even with a very small buffer of 5 packets, a transmission using an ACK regulator is able to maintain a throughput of over 80% of the maximum throughput of 200 kb/s. Thus, the use of an ACK regulator delivers robust throughput performance across different buffer sizes.

Figure 12:
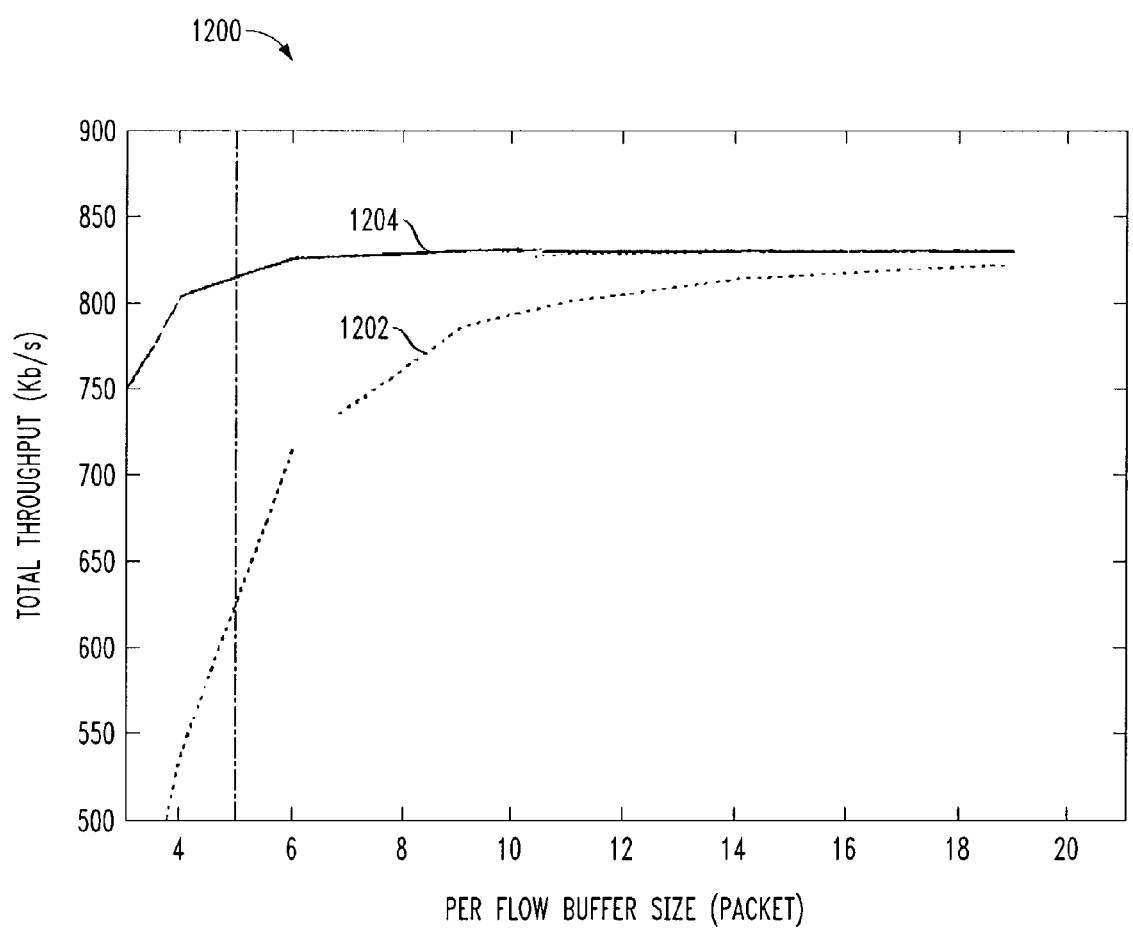
FIG. 12 illustrates a graph of throughput versus buffer size for multiple TCP flows with and without the use of an ACK regulator according to an aspect of the present invention.

FIG. 12 illustrates a graph 1200, showing curves 1202 and 1204. The curve 1202 plots combined throughput against buffer size for four TCP flows without the use of an ACK regulator, while the curve 1204 plots the combined throughput for four flows with the use of an ACK regulator in the presence of an ACK regulator in accordance with the present invention. It can be seen by comparing the curves 1202 and 1204 that the use of the ACK regulator provides substantial throughput advantages, especially for small buffer sizes, and that to achieve maximum throughput without the use of the ACK regulator, a buffer size is required that is over three times larger than that required when using the ACK regulator.

Figure 13:
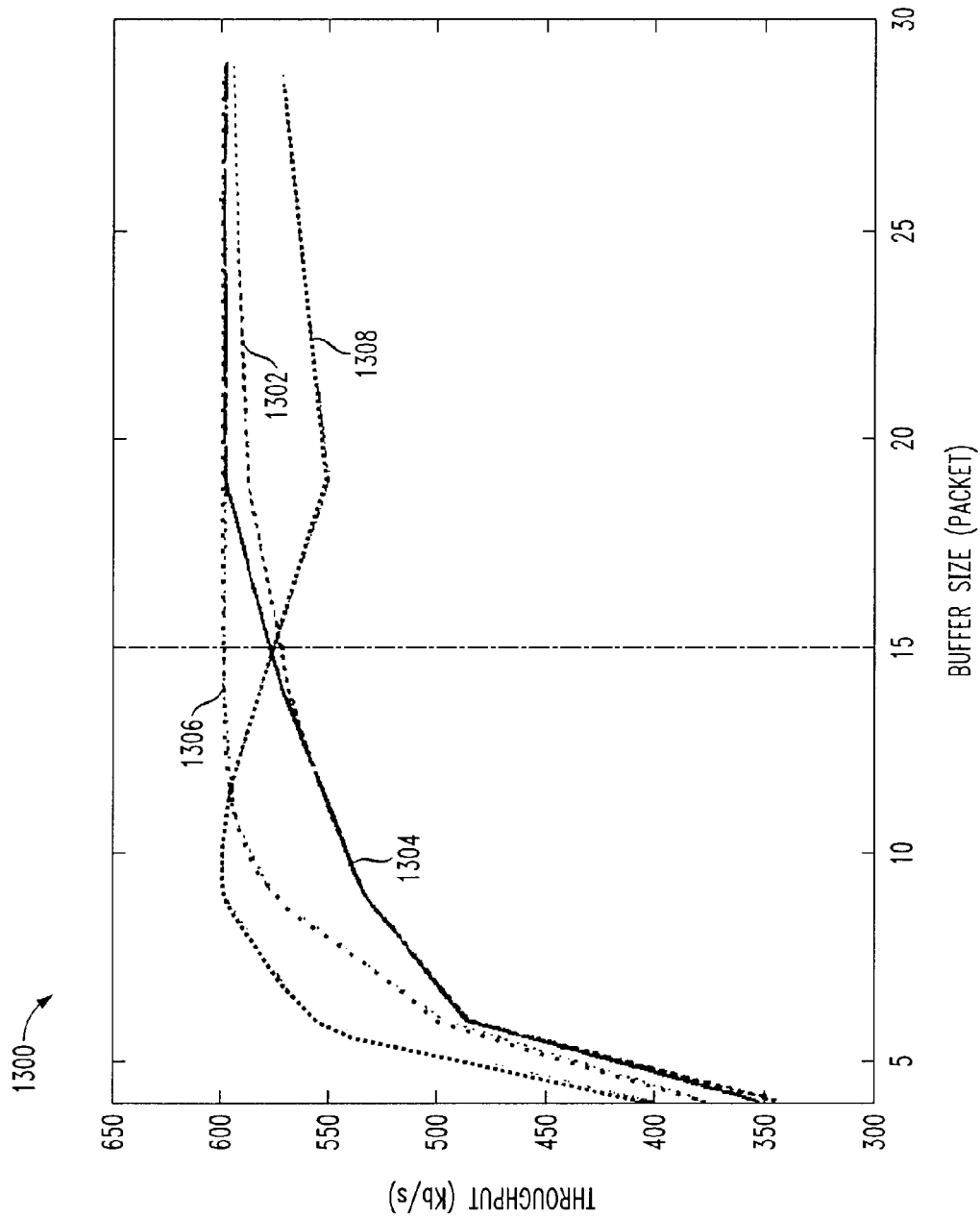
FIG. 13 illustrates throughput versus buffer size for various values of a parameter used to determine whether conservative mode or nonconservative mode is used by an ACK regulator according to an aspect of the present invention.
Figure 14:
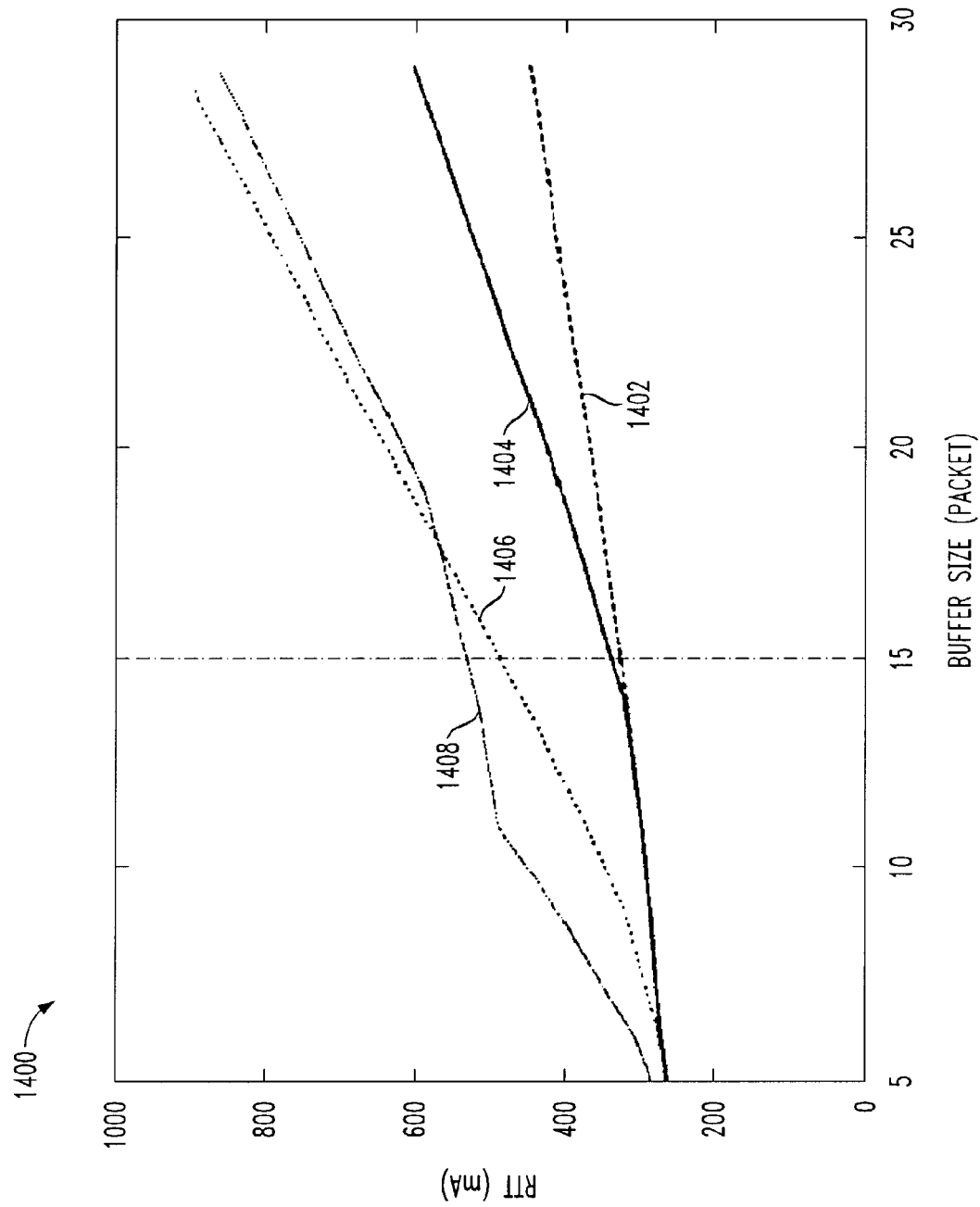
FIG. 14 illustrates delay versus buffer size for various values of a parameter used to determine whether conservative mode or nonconservative mode is used by an ACK regulator according to an aspect of the present invention.

FIGS. 13 and 14 illustrate the effects of varying the parameter a, used to control when the ACK regulator enters or leaves conservative mode. In conservative mode, buffer space is reserved so that the chance of packet loss is minimal and the ACK regulator goes into nonconservative mode when the window size is greater than a times buffer size. Increasing a delays loss until the window size is significantly larger, thereby increasing bandwidth, but at a cost of round trip time.

FIG. 13 illustrates a graph 1300, showing curves 1302-1308. The curves 1302-1308 plot throughput against buffer size for values of α of 1-4, respectively. It can be seen that as α increases from 1-3, the buffer size at which throughput attains its maximum decreases.

FIG. 14 illustrates a graph 1400, showing curves 1402-1408. The curves 1402-1408 plot round trip time against buffer size for values of α of 1-4, respectively. As expected, the round trip time increases with increasing values of α. It will be noted from examination of the curve 1308 that when α=4, throughput decreases for larger buffer sizes. This phenomenon also holds true for values of α larger than 4, and is caused by the accumulation of duplicate ACKs, causing the sending of duplicate packets. Therefore, the value of α should be kept relatively small.

While the present invention has been disclosed in the context of various aspects of presently preferred embodiments, it will be recognized that the invention may be suitably applied to other environments consistent with the claims which follow.

We claim:

1. An acknowledgement signal regulator for controlling transmission of acknowledgement signals to a TCP data source, comprising:
    a data queue for storing data packets having sequence numbers, said packets received from the TCP source;
    an acknowledgement signal queue for storing acknowledgement signals to be transmitted to the TCP source;
    a data monitor for determining the number of data packets in the data queue and the number of acknowledgement signals in the acknowledgement signal queue; and
    an acknowledgement signal release manager for determining the available capacity of the data queue and estimating the number of data packets in transit to the data queue and managing the release of acknowledgement signals to the TCP source so as to prevent an undesired overflow of the data queue, the acknowledgement signal release manager estimating the size of a TCP window at the TCP based on a difference between a largest sequence number in the data queue and a smallest sequence number in the acknowledgment signal queue and adjusting based on the estimate of the size of the TCP window, the acknowledgement signal release manager computing a space availability variable indicating the space available in the data queue;
    computing a release count variable indicating the number of acknowledgement signals that have been transmitted to the TCP source and an estimate of the number of inbound data packets; and updating the value of the space availability variable by subtracting the value of the release count variable from the value of the space availability variable, updating of the space availability variable including selecting one of a conservative mode in which the computation of the space availability variable is performed so as to reserve additional space in the data queue beyond that indicated by the number of data packets in and bound for the data queue, and a nonconservative mode in which computation of the space availability variable is performed so that such additional space in the data queue is not reserved, reservation of space in the data queue.

2. The acknowledgement signal regulator of claim 1, wherein the acknowledgement signal release manager prevents an overflow of the data queue whenever an estimate of the TCP window size at the TCP source is below a predetermined threshold.

3. The acknowledgement signal regulator of claim 2, wherein the acknowledgement signal release manager allows no more than a single packet loss when the estimate of the TCP window size is above the predetermined threshold.

4. The acknowledgement signal regulator of claim 3, wherein the acknowledgement release manager computes a value for a space availability variable indicating the available space in the data queue, computes a value for a release count variable indicating the number of acknowledgement signals that have been transmitted and an estimate of the number of inbound data packets and updates the value of the space availability variable by subtracting the value of the release count variable from the value of the space availability variable.

5. The acknowledgement signal regulator of claim 4, wherein the acknowledgement release manager increases the value of the release count variable by one when the acknowledgement signal regulator is operating in the conservative mode.

6. The acknowledgement signal regulator of claim 5, wherein the acknowledgement signal regulator operates in conservative mode upon initial startup and switches to nonconservative mode when an estimated size of the TCP window of the TCP source is greater than the predetermined threshold.

7. The acknowledgement signal regulator of claim 6, wherein the acknowledgement signal regulator switches to conservative mode when the length of the data queue decreases to 0 or when the estimated size of the TCP window falls below a predetermined value.

8. A data transmission system for wireless transmission of TCP data, comprising:
a radio network controller for receiving data packets having sequence numbers from a TCP source and preparing the data packets for wireless transmission, the radio network controller being operative to send an acknowledgement signal to the TCP source in response to receipt of and acknowledgement of a data packet by a wireless device belonging to the radio network; and
an acknowledgement signal regulator for controlling transmission of acknowledgement signals to the TCP source, the acknowledgement signal regulator estimating the size of a TCP window at the TCP source based on a difference between a largest sequence number in the data queue and a smallest sequence number in the acknowledgement signal queue, and adjusting based on the estimate of the size of the TCP window, the acknowledgement signal regulator being operative to receive and queue acknowledgement signals for transmission to the TCP source, the regulator being operative to examine a data queue containing packets received at the radio network controller and queued for transmission and to estimate a number of data packets in transit from the TCP source, the acknowledgement signal regulator computing a space availability variable indicating the available space in the data queue, computing a release count variable indicating the number of acknowledgement signals that have been transmitted and an estimate of the number of inbound data packets, updating the value of the space availability variable by subtracting the value of the release count variable from the value of the space availability variable and to release for transmission the number of acknowledgement signals represented by the updated value of the space availability variable, and based upon the updated value of the space availability, variable selecting one of a conservative mode of operation in which the computation of the space availability variable is performed so as to reserve additional space in the data queue beyond that indicated by the number of data packets in and bound for the data queue, and a nonconservative mode of operation in which computation of the space availability variable is performed so that such additional space in the data queue is not reserved, the reservation of space in the data queue.

9. The transmission system of claim 8, wherein the acknowledgement signal regulator operates upon enqueueing of an acknowledgement signal or dequeueing of a data packet.

10. The data transmission system of claim 9, wherein the acknowledgement signal regulator increases the value of the release count variable by one when operating in the conservative mode.

11. The data transmission system of claim 10, wherein the acknowledgement signal regulator operates in conservative mode upon initial startup and switches to nonconservative mode when an estimated size of a TCP window of the TCP source is greater than a predetermined value.

12. The data transmission system of claim 11, wherein the acknowledgement signal regulator switches to conservative mode when the length of the data queue decreases to 0 or when the estimated size of the TCP window falls below a predetermined value.

13. The data transmission system of claim 12, wherein the predetermined value against which the estimated size of the TCP window is compared is based on a product of a predetermined multiplier and a value indicating the size of the data queue in packets.

14. The data transmission system of claim 13, wherein the multiplier varies with the size of the data queue.

15. The data transmission system of claim 14, wherein the release count variable is incremented for every acknowledgement signal transmitted and decremented for every data packet received at the data buffer while being prevented from falling below 0.

16. The data transmission system of claim 15, wherein the release count variable is reset to 0 whenever the data queue is empty.

17. The data transmission system of claim 16, wherein the acknowledgement regulator is implemented as software executed by the radio network controller.

18. A method of managing TCP data transmission from a TCP source, comprising the steps of
storing data packets received from the TCP source in a data queue;
storing acknowledgement signals to be transmitted to the TCP source in an acknowledgement signal queue;

examining the data queue for dequeueing of a data packet and the acknowledgement signal queue for enqueueing of an acknowledgement signal;

upon detection of dequeueing of a data packet or enqueueing of an acknowledgement signal:

computing a space availability variable indicating the space available in the data queue;

computing a release count variable indicating the number of acknowledgement signals that have been transmitted to the TCP source and an estimate of the number of inbound data packets;

updating the value of the space availability variable by subtracting the value of the release count variable from the value of the space availability variable, updating of the space availability variable including selecting one of a conservative mode in which the computation of the space availability variable is performed so as to reserve additional space in the data queue beyond that indicated by the number of data packets in and bound for the data queue, and a nonconservative mode in which computation of the space availability variable is performed so that such additional space in the data queue is not reserved, reservation of space in the data queue; and transmitting a number of acknowledgement signals equal to the lesser of the value of the space availability variable and the number of acknowledgement signals in the acknowledgement signal queue.

19. The method of claim 18 wherein the step of computing the release count variable is followed by a step of incrementing the release count variable by one if the conservative mode of operation is chosen.

20. The method of claim 19, wherein the nonconservative mode is chosen when an estimated TCP window size of the TCP source is greater than a predetermined value.

* * * * *